US006914791B1

(12) United States Patent  (10) Patent No.: US 6,914,791 B1
Park et al.  (45) Date of Patent: Jul. 5, 2005

(54) HIGH EFFICIENCY TRIPLE WELL CHARGE PUMP CIRCUIT

(75) Inventors: Ki-Tae Park, Beacon, NY (US); Shimeno Koji, Beacon, NY (US); Tomoko Ogura, Hopewell Jct., NY (US)

(73) Assignee: Halo LSI, Inc., Hillsboro, OR (US)

( * ) Notice: Subject to any disclaimer, the term of this patent is extended or adjusted under 35 U.S.C. 154(b) by 121 days.

(21) Appl. No.: 10/602,228

(22) Filed: Jun. 24, 2003

Related U.S. Application Data
(60) Provisional application No. 60/424,252, filed on Nov. 6, 2002.

(51) Int. Cl.[7] .............................................. H02M 3/07
(52) U.S. Cl. ........................................ 363/60; 327/536
(58) Field of Search ................................. 323/313, 314; 327/536; 363/59, 60

(56) References Cited

U.S. PATENT DOCUMENTS

| | | | | |
|---|---|---|---|---|
| 5,610,550 A | * | 3/1997 | Furutani ...................... | 327/543 |
| 5,815,026 A | | 9/1998 | Santin et al. ................ | 327/536 |
| 5,925,905 A | | 7/1999 | Hanneberg et al. .......... | 257/299 |
| 5,978,283 A | * | 11/1999 | Hsu et al. ............... | 365/189.09 |
| 5,986,947 A | | 11/1999 | Choi et al. .............. | 365/189.11 |
| 6,046,625 A | | 4/2000 | Menichelli ................... | 327/536 |
| 6,100,557 A | | 8/2000 | Hung et al. .................. | 257/299 |
| 6,130,572 A | * | 10/2000 | Ghilardelli et al. ......... | 327/536 |
| 6,130,574 A | | 10/2000 | Bloch et al. ................. | 327/536 |
| 6,212,107 B1 | | 4/2001 | Tsukada ................. | 365/189.09 |
| 6,418,040 B1 | | 7/2002 | Meng ........................... | 363/60 |
| 6,496,055 B2 | * | 12/2002 | Li .............................. | 327/536 |
| 6,677,805 B2 | * | 1/2004 | Shor et al. ................... | 327/536 |
| 6,677,806 B2 | * | 1/2004 | Bloch .......................... | 327/536 |
| 6,812,774 B2 | * | 11/2004 | Kim ............................ | 327/536 |
| 6,819,162 B2 | * | 11/2004 | Pelliconi ..................... | 327/536 |

OTHER PUBLICATIONS

"A 3.3 V–Only 16 Mb DINOR Flash Memory," IEEE International Solid State Circuits Conference, Digest of Technical Papers, 1995, pp. 122–123.
"A 5–V–Only 0.6μm Flash EEPROM with Row Decoder Scheme in Triple–Well Structure", IEEE Journal of Solid State Circuits, vol. 27, No. 11, Nov. 1992, pp. 1540–1545.
On–Chip High–Voltage Generation in MNOS Integrated Circuits Using Improved Voltage Multiplier Technique, IEEE Journal of Solid–State Circuits, vol. 11, No. 3, Jun. 1976, pp. 374–378.

* cited by examiner

*Primary Examiner*—Jeffrey Sterrett
(74) *Attorney, Agent, or Firm*—George O. Saile; Stephen B. Ackerman

(57) ABSTRACT

An improved charge pump circuit is provided using a triple-well structure where the charge pump circuit has a plurality of stages containing N-channel MOSFET devices in which each stage is contained in a P-well within a Deep N-well residing on a P-substrate. Each pump stage is formed in its own P-well and the pumping stages are serially connected from power supply source to the output terminal. Each pumping stage includes a charge transfer device, a first auxiliary device to precharge the gate of the charge transfer device with a voltage from the previous stage, and a second auxiliary device to switch coupling between the charge transfer device and its substrate region to reduce the body effect and increases the capacitive boosting effect. The multiple stages of circuitry are clocked from either a four-phase clock or a two-phase clock.

38 Claims, 7 Drawing Sheets

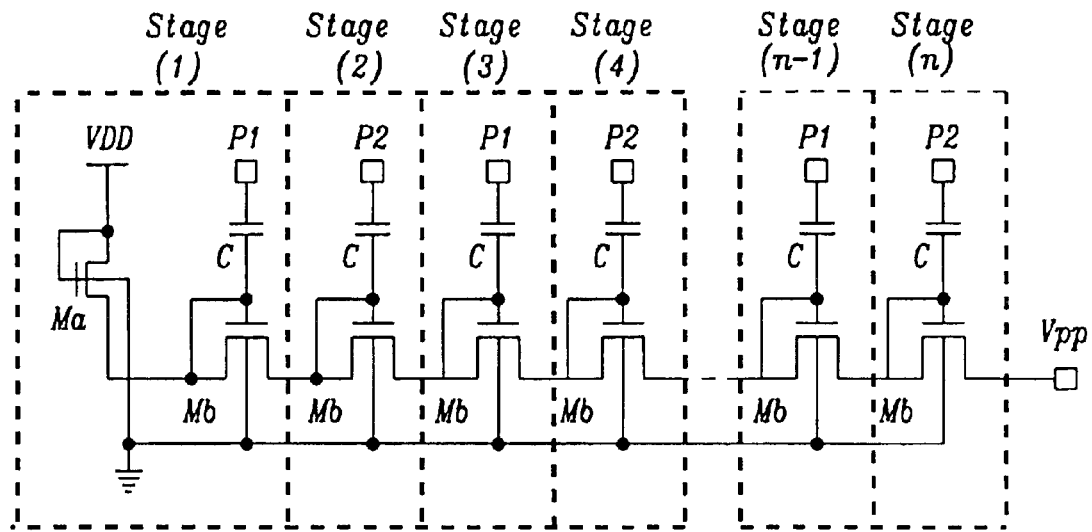
FIG. 1 — Prior Art
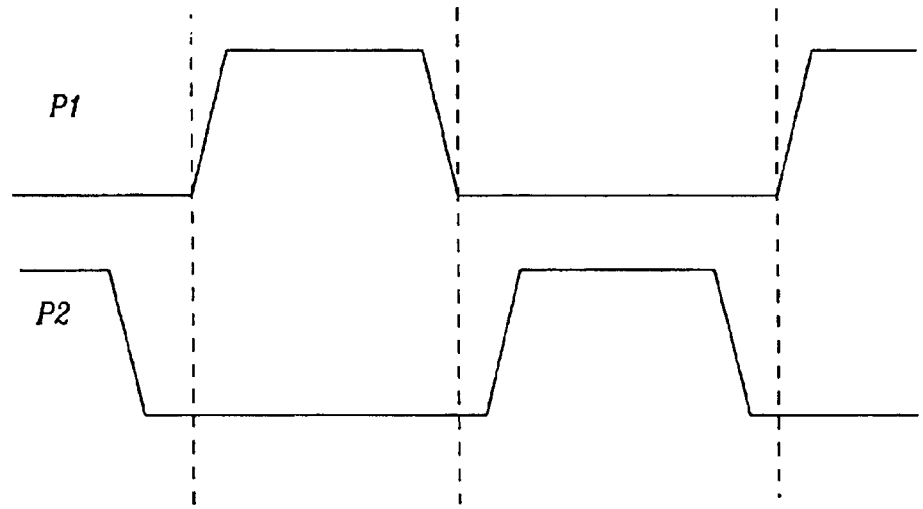
FIG. 2 — Prior Art

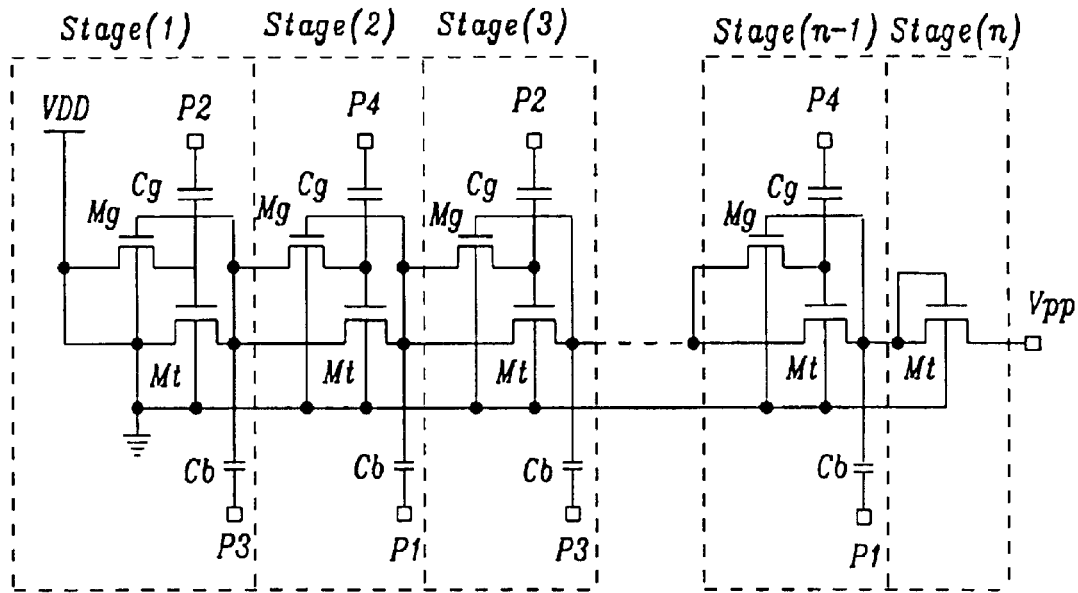
FIG. 3 — Prior Art
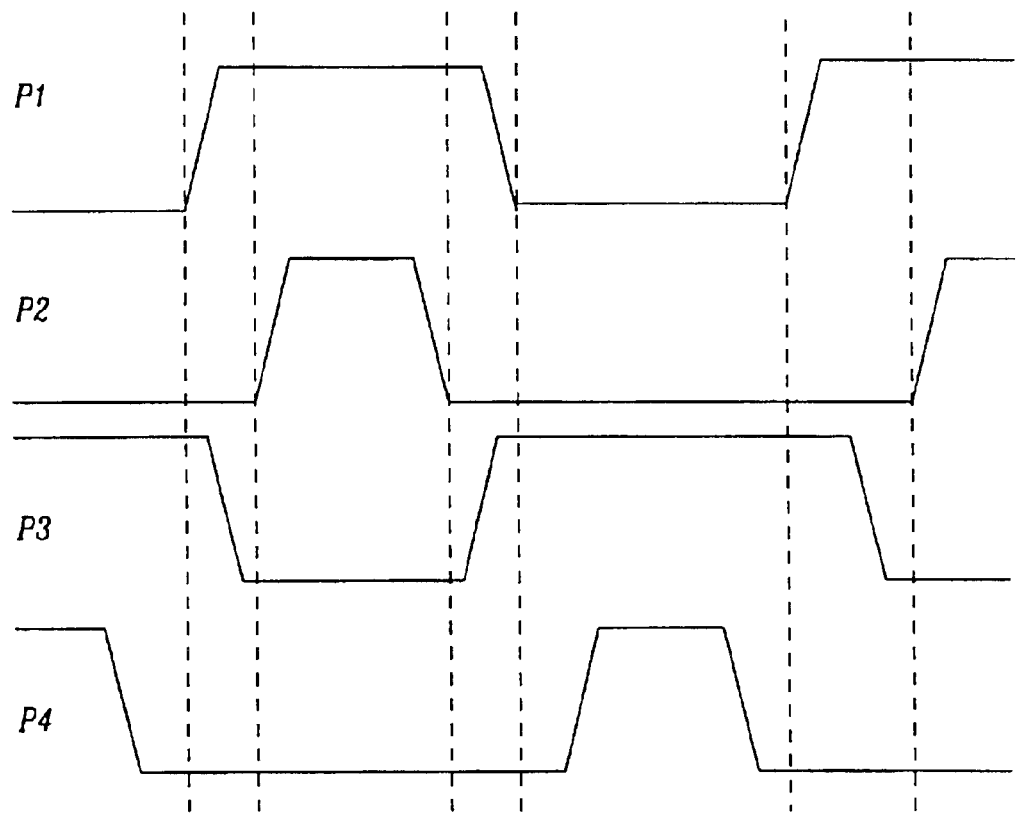
FIG. 4 — Prior Art

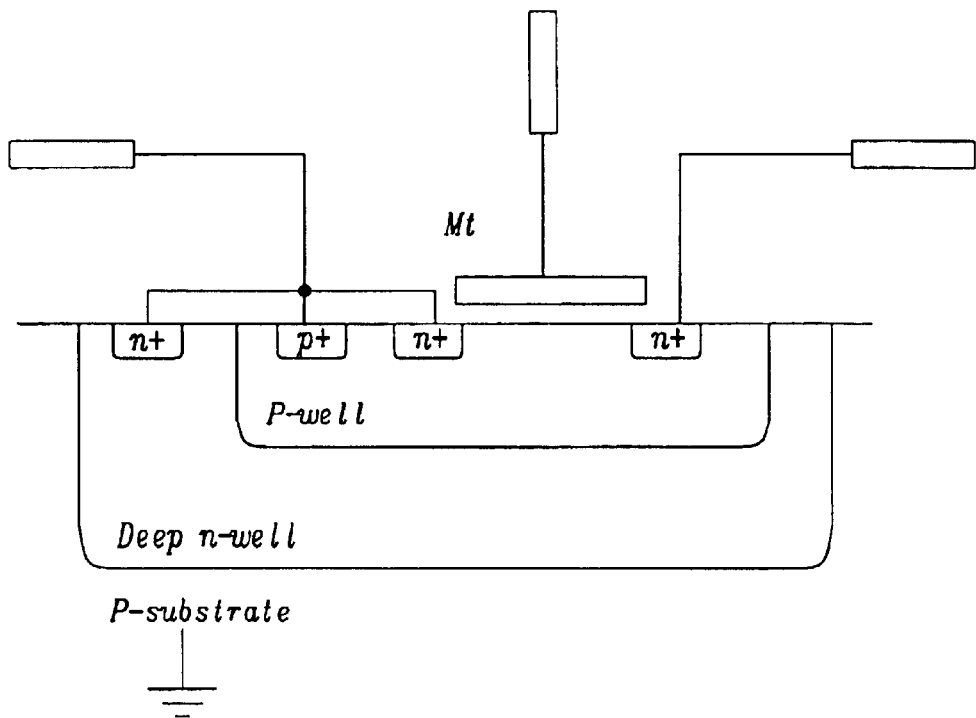
FIG. 5 – Prior Art
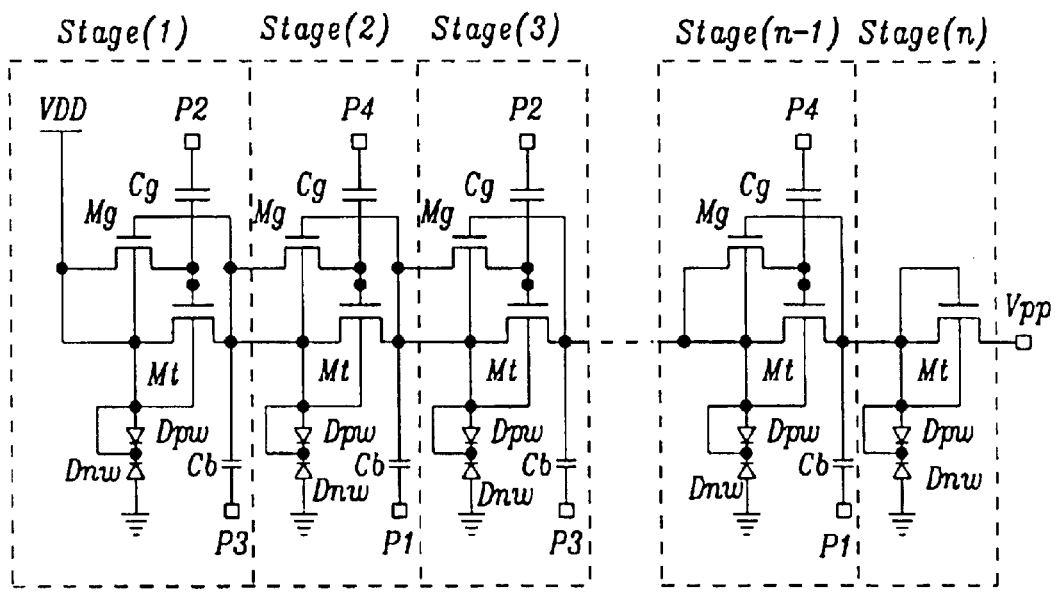
FIG. 6 – Prior Art

HIGH EFFICIENCY TRIPLE WELL CHARGE PUMP CIRCUIT

This application claims priority to Provisional Patent Application Ser. No. 60/424,252, filed on Nov. 6, 2002, which is herein incorporated by reference

BACKGROUND OF THE INVENTION

1. Field of Invention

The present invention relates to integrated circuits and more specifically to charge pump circuits providing high output voltage and current at low power supply voltages.

2. Description of Related Art

A charge pump is widely used in semiconductor memories, and in particular non-volatile Electrically Erasable and Programmable Read Only Memories (EEPROM) where a voltage larger than the supplied chip voltages, such as 3.3V, 2.5V is generally required up to 10V or more. These high voltages are typically not available on the chip so they are generated from the low supplied voltage. These higher voltages are mainly required in such operations as programming and erase of a memory cell. As the power supply voltage to the chip is reduced down in the range of 1.2 to 1.8 volts and below as seen in recent mobile applications, voltages higher than the power supply voltage may be required for read operations of non-volatile memories to maintain read performance. Thus there is an increasing demand for low voltage driven charge pumps that can produce a high output voltage and current.

U.S. Pat. No. 6,418,040 B1 (Meng) is directed to a cross coupled charge pump that can provide a high positive or negative or negative output voltage depending upon which state the two input voltages of the charge pump are used. In U.S. Pat. No. 6,212,107 B1 (Tsukada) a charge pump is directed to providing a stepped voltage and includes a leakage current suppression circuit. U.S. Pat. No. 6,130,574 is directed to providing a negative voltage charge pump, wherein each stage contains three or four MOS transistors and has two clocks operating at different phases. U.S. Pat. No. 6,046,625 is directed to providing a charge pump circuit having multiple mirrored stages that are controlled by logic circuitry that receives a clock signal and an enable signal. In U.S. Pat. No. 5,925,905 (Hanneberg et al.) a MOS circuit configuration is directed to a high voltage charge pump without using deep insulating wells. In U.S. Pat. No. 5,815,026 a charge pump circuit is directed to providing a high voltage low current at a high efficiency.

A conventional charge pump circuit based on a diode structure is discussed in "On-Chip High-Voltage Generation in NMOS Integrated Circuits Using Improved Voltage Multiplier Technique", IEEE Journal of Solid-State Circuits, Vol. 11, No. 3, June 1976, pp 374–378. As shown in FIG. 1, the charge pump includes a plurality of pumping stages that are serially connected between supply voltage VDD and the output voltage Vpp. The supply voltage VDD is connected through a source device Ma to the series connections of charge transfer MOS devices Mb, which produce a high voltage output Vpp. The substrate regions of the charge transfer MOS devices Mb are held at ground. Each stage is clocked through a storage capacitor C with a clock signal P1 or P2 that are at a different phase as shown in FIG. 2. Each of these clock signals provides a high level of VDD power supply voltage and a low level of ground. The clocks are phased such that charge is transferred to the output of the first stage while the second stage is held off and then the first stage is held off while the charge from the first stage is clocked to output of the second stage. This alternate clocking of adjacent stages continues through the remainder of the serially connected charge pump circuit. The technique of prior art has been widely used, but suffers from degradation in threshold voltage of charge transfer MOS devices during its operation. The voltage between the source and substrate regions of each charge transfer MOS device Mb gradually increases during operation, which results in increasing of the effective threshold voltage of the charge transfer MOS devices Mb in each pump stage. This effect is often referred to as 'Body effect'.

In general, the output voltage of conventional charge pump circuit, Vout can be expressed as, $$Vout = VDD - V_{th}(V_{sb}) + \sum_{i=1}^{N} [\alpha VDD - V_{th}(V_{sb})]$$

where $V_{th}(V_{sb})$ is threshold voltage of MOS device including body effect, VDD is power supply voltage, and N is number of stages. The $\alpha$ is boost coupling ratio at each node and can be given by $$\alpha = \left(\frac{C_b}{C_b + C_p}\right)$$

where $C_b$ and $C_p$ are boost coupling capacitance and stray parasitic capacitance, respectively. As a result the maximum output voltage of the conventional charge pump circuit is limited and the efficiency decreases as the number of stages increase, especially for low power supply voltage.

New techniques have been proposed to overcome the problems of the conventional charge pump circuit. A representative charge pump circuit of prior art using a four-phase clock scheme which is described in "A 5V Only 0.6 um Flash EEPROM with Row Decoder Scheme in Triple Well Structure", IEEE Journal of Solid State Circuits, Vol. 27, No. 11, November 1992, pp 1540–1545, is shown in FIG. 3. The charge pump circuit includes a number of stages of a charge transfer MOS device Mt and an auxiliary MOS device Mg which is used to precharge the gate terminal of the charge transfer MOS device Mt for high boosting gate effect. The substrate regions of the charge transfer MOS devices Mt are held at ground. A supply voltage VDD is applied to a drain of a charge transfer MOS device Mt and an auxiliary MOS device Mg in the first stage. In subsequent stages the output of the previous stage is connected to the source of the charge transfer device Mt, the auxiliary MOS device Mg. There are two capacitors in each stage Cg and Cb, which are connected to different clocks, P2 and P3 for the first stage and P4 and P1 for the second stage. The four individual clocks, P1, P2, P3, and P4 are shown in FIG. 4. The clocks are phased such that charge is transferred to the output of the first stage wile the second stage is held off and then the first stage is held off while the charge from the first stage is clocked to output of the second stage. This alternate clocking of adjacent stages continues through the remainder of the serially connected charge pump circuit.

A prior art charge pump circuit using a floating well is described in U.S. Pat. No. 5,986,947 (Choi et al.). The charge pump circuits using a triple well P-N junction and MOS diodes are disclosed in "A 3.3V only 16 Mb DINOR flash memory", IEEE International Solid State Circuits Conference, Digest of Technical Papers, 1995, pp 122–123, and in U.S. Pat. No. 6,100,557 (Hung et al.), respectively. The triple well charge pump provides greater efficiency with increased suppression of the body effect over other prior art. This improvement is due to the extra diode inherently formed between the well and the source of the charge transfer MOS device that can help increase the forward conduction current.

In FIG. 5 is shown a diagram of a cross sectional view of a charge pump circuit of prior art in a triple well. The drain of the charge transfer MOS device Mt is connected to the P-well and the deep N-well. This allows a parasitic capacitor between the P-well and the deep N-well and a parasitic capacitor between the deep N-well and the P-substrate. The P-well and the deep N-well consume more silicon area than the charge transfer MOS device creating large junction capacitors and diodes. There are two more parasitic diodes formed at the junctions of the source and drain of the charge transfer MOSFET device and the P-well. These diodes are much smaller that than those of the P-well to deep N-well and deep N-well and the P-substrate and are omitted from the diagrams. The diodes for the P-well and the deep N-well, Dpw and Dnw, are shown in the schematic of FIG. 6.

The parasitic capacitance of the P-well and the deep N-well negatively affects the boosting voltage coupled to the drain of the charge transfer MOS device when the boosting clock signal is on. The parasitic diodes Dpw and Dnw provide a reverse bias leakage current form the drain node of the charge transfer MOS device to the P-substrate that is connected to ground. These two effects cause a degradation of efficiency of the charge pump circuit, especially at low power supply voltages. Since th parasitic junction capacitance and the leakage current of the parasitic diode are layout dependent, the output characteristics of the conventional triple-well charge pump circuit is easily affected by layout and process variations.

SUMMARY OF THE INVENTION

It is an objective of the present invention to provide a higher boosted voltage and current output using a low power supply operation and within a small layout area.

It is further an objective of the present invention to provide a multi-stage charge pump circuit in which each stage delivers a higher voltage and current to the subsequent stage.

It is also an objective of the present invention to provide MOSFET devices within a triple well of each stage of the multi-stage charge pump circuit.

It is also an objective of the present invention to provide a charge transfer and auxiliary MOSFET devices within a same P-well contained within a deep N-well of each stage of the multi-stage charge pump circuit.

It is also an objective of the present invention for each stage of the multi-stage charge pump to contain a deep N-well that is electrically isolated from the deep N-well of other stages.

It is further an objective of the present invention to electrically isolate the drain of the charge transfer MOSFET from the parasitic capacitance of the P-well and deep N-well within which the P-well resides.

It is still further an objective of the present invention to provide a boosted voltage at the gate of the charge transfer MOSFET device by a boost coupling capacitor increased by an auxiliary MOSFET device connected to the source node of the charge transfer device.

It is still further an objective of the present invention to reduce the body effect to the charge transfer MOSFET device by the transfer of the boosted source voltage by an auxiliary MOSFET device to the P-well and N-well of each stage, which is then floated when the auxiliary device is turned off.

It is also further an objective of the present invention to drive the multi-stage charge pump with a four-phase clock.

It is still further an objective of the present invention allow the multi-stage charge pump circuit to be driven by a two-phase clock.

In the present invention a charge pump circuit is disclosed that has multiple stages connected in series. In each stage there are three MOSFET devices residing in a P-well within a deep N-well unique to each stage and on a P-substrate. The three MOSFET devices of each stage comprise one charge transfer device, one auxiliary MOSFET device for pre-charging a voltage on the gate of the charge transfer device and one auxiliary MOSFET device for buffering the drain of the charge transfer device from the P-well and the deep N-well. Each stage also contains two boost capacitors needed to store charge as it is developed. Each stage is clocked by two clock signals that are out of phase with each other. The serial connected stages are clocked such that the corresponding clocks signals for adjacent stages are out of phase with each other. Thus, a four clock system is used; however, with the proper arrangement of two clock signals, a two clock system can also be used. When charge is being clocked into a first stage, pumped charge is being clocked into a third stage from the second stage.

The auxiliary device, which is used for pre-charging a voltage on the gate of the charge transfer device, couples the input signal of each stage to the gate of the charge transfer device; and therefore, increases the boost coupling effect on the charge transfer MOS device, which results in increasing a signal level at the source (output) of the charge transfer device. The auxiliary device, that is used for buffering the drain of the charge transfer device from the P-well and the N-well, couples the drain voltage of the charge transfer device to the P-well and the deep N-well to reduce the body effect and to improve capacitive coupling effect on the drain of charge transfer MOSFET device by reducing the effects of the P-well and Deep N-well parasitic capacitance.

It should be noted that although the present invention has been oriented to a charge pump circuit formed from N-channel MOSFET devices in a P-well within a deep N-well on a P-substrate, a similar charge pump circuit could be formed from P-channel MOSFET devices in an N-well within a deep P-well residing on an N-substrate.

BRIEF DESCRIPTION OF THE DRAWINGS

This invention will be described with reference to the accompanying drawings, wherein:

FIG. 1 is a circuit diagram of a conventional charge pump circuit of prior art,

FIG. 2 is a diagram showing a two-phase clock that is used in the prior art of FIG. 1, FIG. 3 is a circuit diagram of a charge pump circuit of prior art using a four-phase clock system, FIG. 4 is a diagram showing a four-phase clock that is used in the prior art of FIG. 3, FIG. 5 is a cross section diagram of a charge pump circuit stage of the prior art using a triple well in each stage, FIG. 6 is a circuit diagram of a charge pump circuit of prior art of FIG. 5.

DETAILED DESCRIPTION OF THE PREFERRED EMBODIMENT

Figure 7:
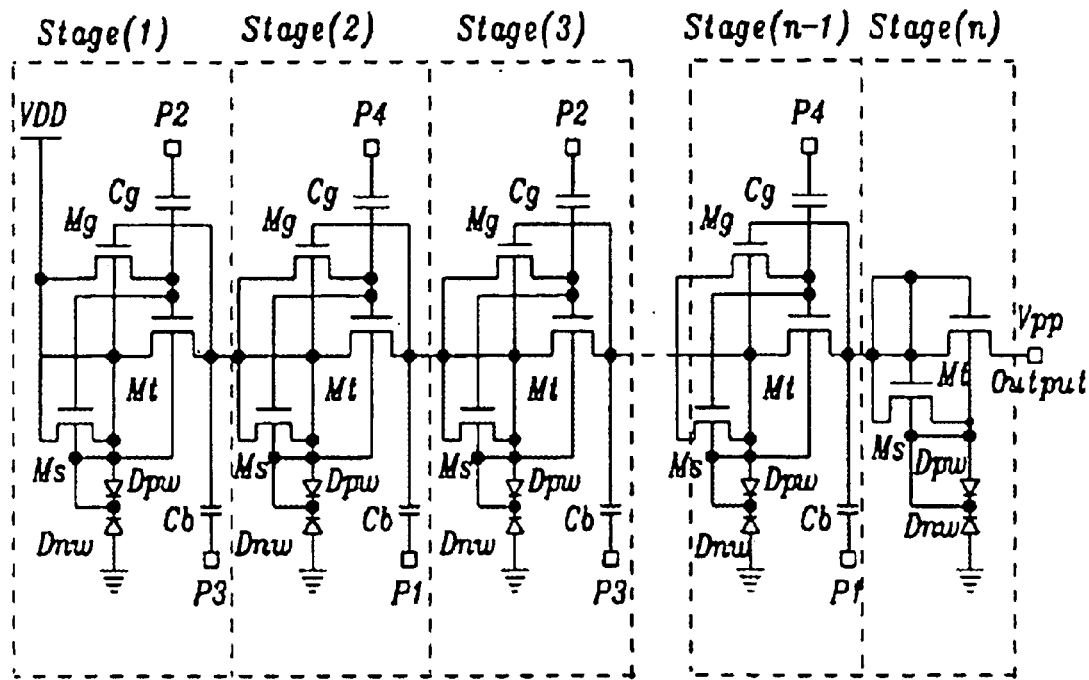
FIG. 7 is a circuit diagram of the charge pump circuit of the present invention.

FIG. 7 shows a circuit diagram of the charge pump of the present invention where the negative effects of the triple well are reduced by the inclusion of the auxiliary MOSFET device Ms. Included in the circuit diagram are Dpw, the parasitic diode between the P-well and the deep N-well, and Dnw, the parasitic diode between the deep N-well and the P-substrate. Other, and less important, parasitic diodes and capacitances associated with MOS devices are not shown for ease of understanding of the circuit diagram. Pumping stages are connected in series from power supply VDD to the high voltage output Vpp. Each pumping stage is formed in its own P-well and deep N-well. The P-well acts as substrate region of the MOS devices in the pumping stage.

Each pumping stage includes three N-channel MOSFET devices, a charge transfer MOS device Mt, an auxiliary MOS device Mg to pre-charge a voltage on the gate of the charge transfer device Mt for increasing boost coupling effect, and an auxiliary device Ms that couples a boosted drain potential of the charge transfer MOS device to the P-well and the deep N-well to switch the coupling between the charge transfer MOS device and the substrate region, thus increasing boost coupling effect and reducing the body effect on the charge transfer MOS device. Also there are two boost-coupling capacitors, Cg and Cb. It also includes a plurality of stages each having the same formation as represented by the first stage. The input to the first stage is the power supply voltage VDD, and the input of each subsequent stage is the output voltage of the previous stage delivered from the source of the charge transfer device of the previous stage. The output of the final stage produces a voltage Vpp that has been pumped up to a higher voltage than the power supply voltage.

Continuing to refer to FIG. 7, an input voltage of a stage is applied to the drain of the charge transfer MOS device Mt within the stage. This same input voltage is coupled to the gate of the charge transfer MOS device Mt by means of an auxiliary MOS device Mg and clock signal P3 in odd numbered stages and clock signal P1 in even number stages. Similarly, a boosted input signal to a stage is coupled to the P-well Dpw and deep N-well Dnw by the auxiliary MOS device Ms, which is gated by the gate signal of the charge transfer MOS device Mt. Clock P2 for odd numbered stages and clock P4 for even number of stages are applied to the gate of the charge transfer MOS device through capacitor Cg.

Figure 8:
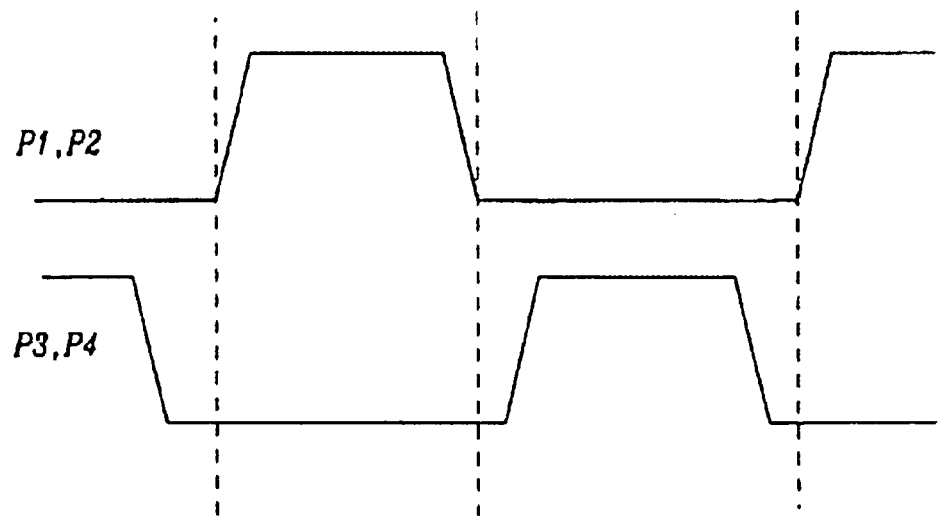
FIG. 8 is a diagram showing a two-phase clock that is used in the present invention.

The conventional four-phase clock system shown in FIG. 4 can be used in the circuit of the present invention. The conventional two-phase clock system can also be used in the present invention circuit by arranging two clocks properly, as shown in FIG. 8. The use of a two phase clock is realized by pairing clocks P1 and P2 together and clocks P3 and P4 together.

The operation of the circuit of the present invention shown in FIG. 7 using a two clock scheme is described with respect to Stage (2). The pumping operation of other stages is carried out in a similar manner. During the first-clock phase, auxiliary MOS device Mg is turned on by the clock P1 so that the gate voltage of the charge transfer MOS device Mt is precharged at a charge shared voltage with a high voltage from the drain node of the MOS device Mt. At the same time, the drain of the charge transfer MOS device Mt is decoupled from P-well and deep N-well because the auxiliary MOS device Ms is off and the body of the pumping stage is floated with a voltage. Then, during second clock phase, the auxiliary MOS device Mg is off and the clocks P3 and P4 couple the drain and gate node of charge transfer MOS device Mt to a high voltage level. Because of the decoupling of the charge transfer device from the parasitic capacitances associated with the P-well and deep N-well, the drain voltage can be efficiently boosted by the clock. Then the charge transfer MOS device Mt and the auxiliary MOS device Ms are simultaneously turned on by clock P4, and the body voltage of the pumping stage is coupled to the drain node of the charge transfer MOS device Mt through the auxiliary MOS device Ms. The charge transfer MOS device Mt passes a boosted high voltage at its drain to the input of next stage without a effective threshold voltage loss due to body effect. This allows it to provide more voltage and current at the output so that the charge pump circuit can be implemented in fewer stages, which results in less silicon die area.

Figure 9:
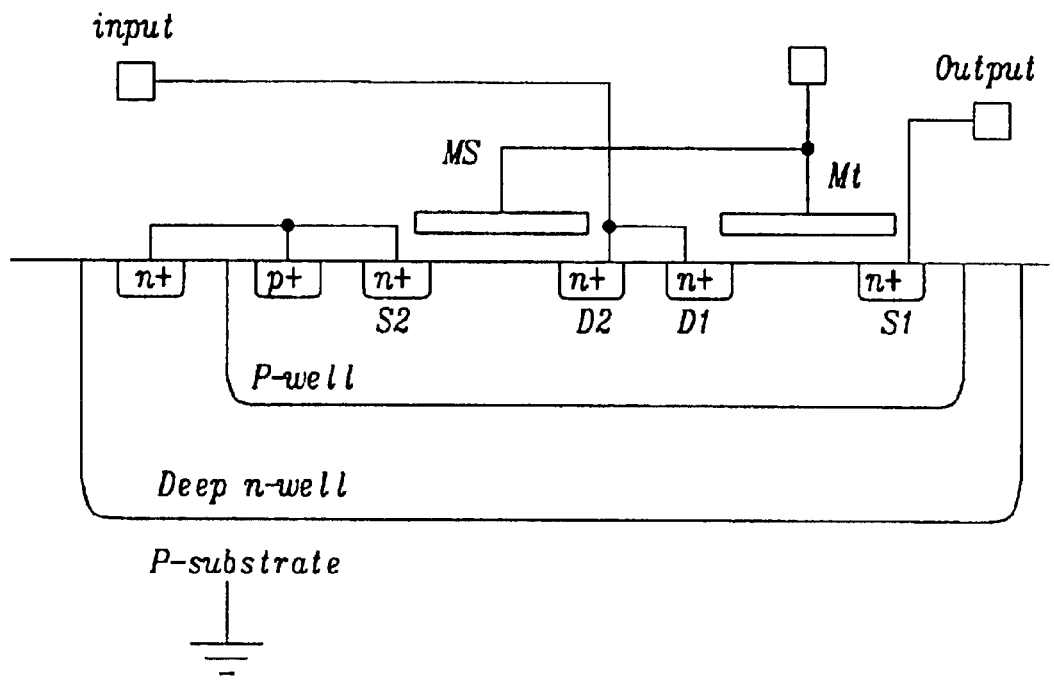
FIG. 9 is a cross section diagram of a charge pump circuit stage of the present invention of FIG. 7.

In FIG. 9 is shown a cross section view of a portion of the circuitry in a stage of the multi-stage charge pump circuit shown in FIG. 7, which includes the charge transfer MOS device Mt and the auxiliary MOS device Ms. Not shown in FIG. 9 is the auxiliary MOS device Mg. The MOS devices Mt and Mg are shown in a P-well within the deep N-well of a stage of the charge pump residing on a P-substrate. An input charge pump voltage from a previous stage is connected to the drain D1 of the charge transfer N-channel MOSFET device Mt and the drain D2 of the auxiliary N-channel MOSFET device Ms. The source S2 of the auxiliary MOSFET device Ms is connected to both the P-well and the deep N-well. A pump clock signal is connected to the gates of the charge transfer MOS device Mt and the auxiliary MOS device Ms through a coupling capacitor Cg (not shown). The output of the stage is taken from the source S1 of the charge transfer MOS device Mt and besides being connected to the next stage, the output is connected to a coupling capacitor Cb (not shown) as well as the gate of the auxiliary MOS device Mg (not shown). The auxiliary MOS device Mg is also located within the same P-well as the charge transfer MOS device Mt and the auxiliary MOS device Ms. From this cross section it is demonstrated how the auxiliary MOS device Ms buffers the drain D1 of the charge transfer MOS device Mt from the P-well and the deep N-well. The input voltage at the drains D1 and D2 of the charge transfer MOS device Mt and the auxiliary MOS device Ms, respectively, is coupled to the P-well and the deep N-well by the auxiliary MOS device Ms controlled by the gate control signal, which is formed from the auxiliary MOS device Mg and the P2 or P4 clock signals at the gate of the charge transfer MOS device Mt schematically shown in FIG. 7. Therefore, the P-well and the deep N-well see a voltage similar to the voltage produced at the input of the charge transfer MOS device Mt when the charge transfer MOS device Mt is turned on. This allows the P-well and the Deep N-well to have a voltage similar to the source S1 of the charge transfer MOS device Mt when it is turned on so that the charge transfer MOS device Mt is able to transfer a boosted high voltage from the input to the output without any voltage loss caused by the body effect. The silicon area penalty resulting from the auxiliary MOS devices Mg and Ms can be negligible because their area is small compared to the charge transfer MOS device Mt and coupling capacitors Cb and Cg.

Figure 10:
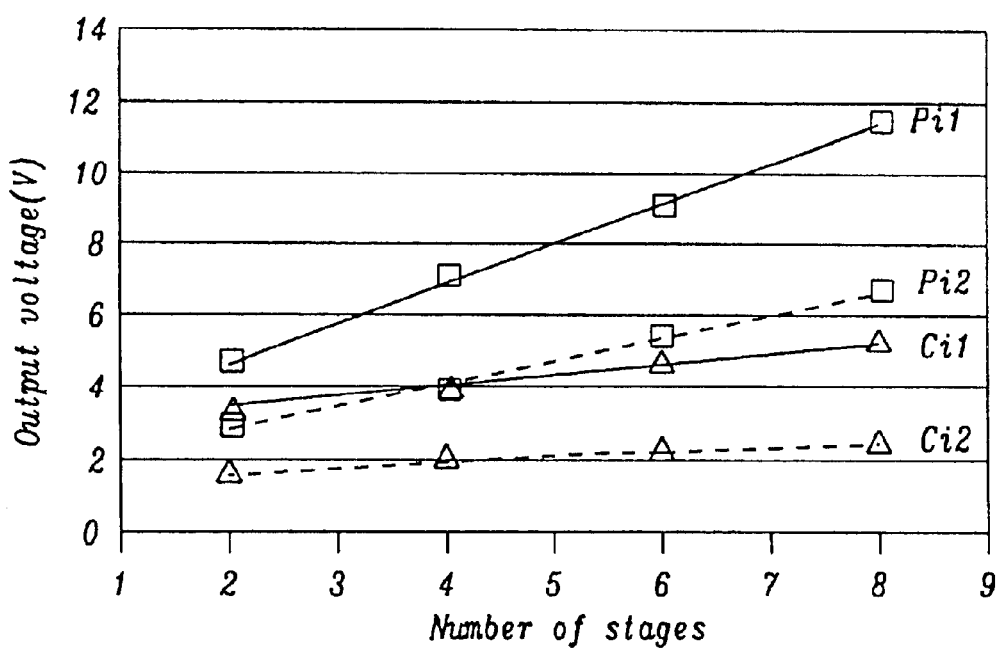
FIG. 10 is an output voltage of the present invention and conventional charge pump circuits as number of stage increases.

FIG. 10 shows a simulated output voltage of the charge pump circuit of present invention as a function of number of stages for power supply voltages VDD=1.2V (curve Pi2) and VDD=1.8V (curve Pi1). The conventional MOS diode charge pump circuit is also plotted for comparison for power supply voltages VDD=1.2V (curve Ci2) and VDD=1.8V (curve Ci1). Two-phase clocks system is used and the frequency of clock is 15 MHz. The channel length of all MOS devices is 0.6 um and the channel width of charge transfer MOS device and auxiliary MOS devices is 35 um and 3 um, respectively. The capacitance of the coupling capacitors Cb and Cg are 1.5 pF and 0.6 pF, respectively. A 5 pF capacitor is used as an output load. According to the results of the simulation, the present invention circuit outperforms the conventional charge pump circuit, especially as the number of stage increases.

Figure 11:
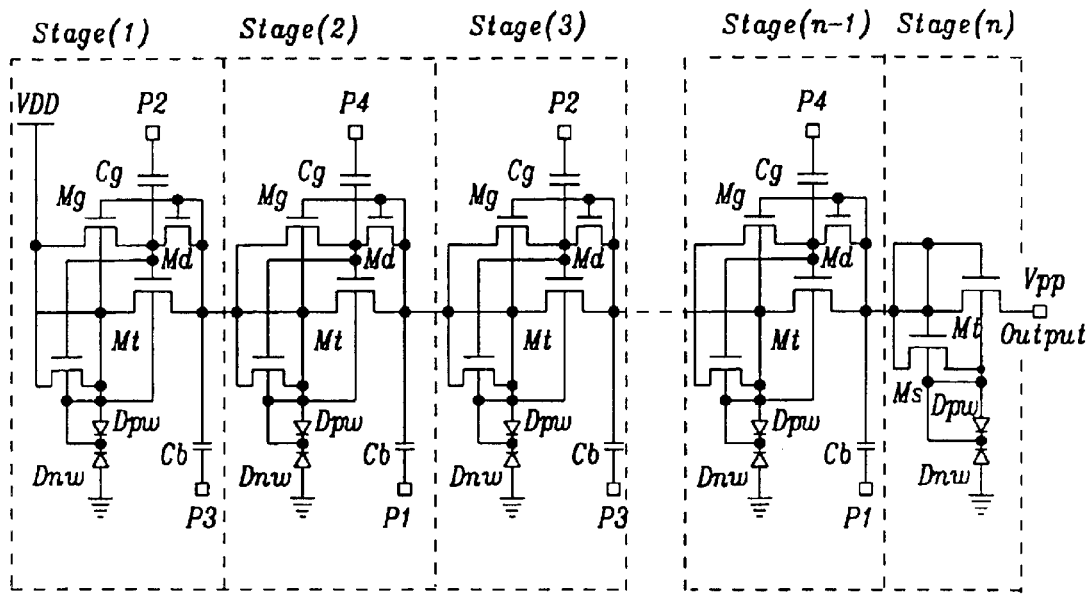
FIG. 11 is a circuit diagram of an alternative charge pump circuit of the present invention.

FIG. 11 shows a second embodiment of charge pump circuit diagram of the present invention. The basic components of the charge pump circuit are as same as the first embodiment of the present invention shown in FIG. 7, except that there is a pull-down N-channel MOSFET device Md. The charge pump circuit includes the charge transfer MOS device Mt, the auxiliary MOS device Mg, and auxiliary MOS device Ms contained within the same P-well inside a deep N-well for each stage. The pull-down MOS device Md, however, can be formed either on the same P-well inside a deep N-well or on the P-substrate. The drain and gate of the pull down device Md are connected to the gate of the charge transfer device Mt, and the source of the pull-down device Md is connected to the output of the pumping stage. The pull-down MOS device Md, which is connected as a diode, is used to prevent back flow of charge from the output to the input of the pumping stage in a situation when the gate voltage of charge transfer device Mt becomes high enough to turn on the charge transfer device Mt (even weakly) and when the clock signal coupled to the gate of the charge transfer device Mt changes from high level of VDD to low level of ground. When this situation occurs during operation, the pull-down MOS device Md keeps the charge transfer device Mt turned off which results in preventing the back flow of the charge from the output to the input of the pumping stage.

Figure 12:
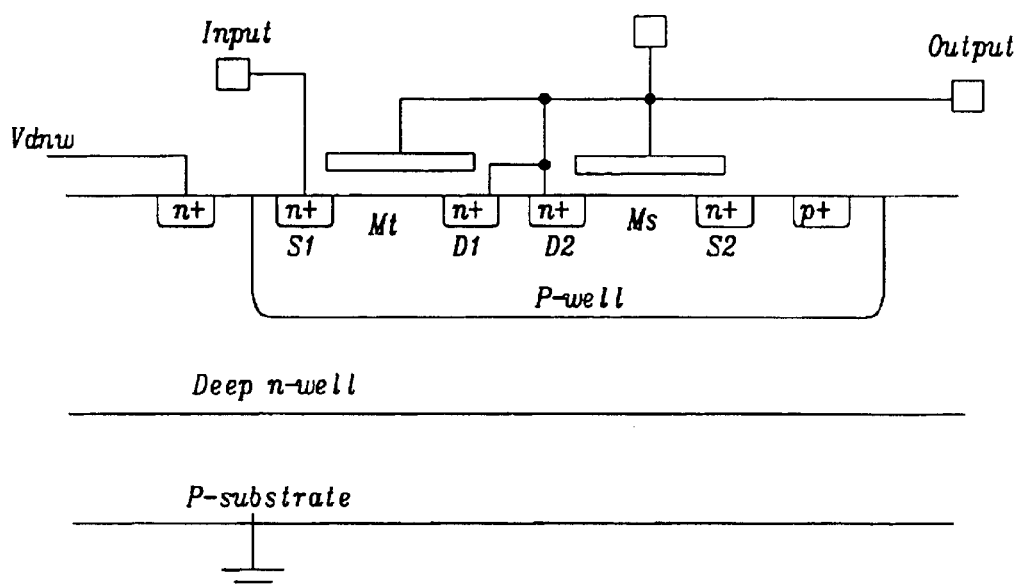
FIG. 12 is a cross section diagram of a charge pump circuit stage of the present invention for generating a negative high voltage output.

A negative high voltage output charge pump circuit can also be realized using the same triple-well structure of the present invention, except that deep N-well is connected to Vdnw, which is a positive voltage and can be a either the power supply VDD, or ground. FIG. 12 shows a cross-sectional view of the charge pump circuit of present invention for a negative high voltage output. The charge transfer MOS device Mt and auxiliary MOS device Ms are formed in their own P-well which act as substrate of the MOS devices. The deep N-well can be shared with other pumping stages and connected to ground or power supply VDD. The source S2 and drain D2 of the auxiliary MOS Ms are coupled to the P-well and the drain D1 of the charge transfer MOS device Mt, respectively. The drains D1 and D2 and the gates of the charge transfer device Mt and auxiliary device Ms are coupled together and are further connected to the coupling capacitor Cb.

Figure 13:
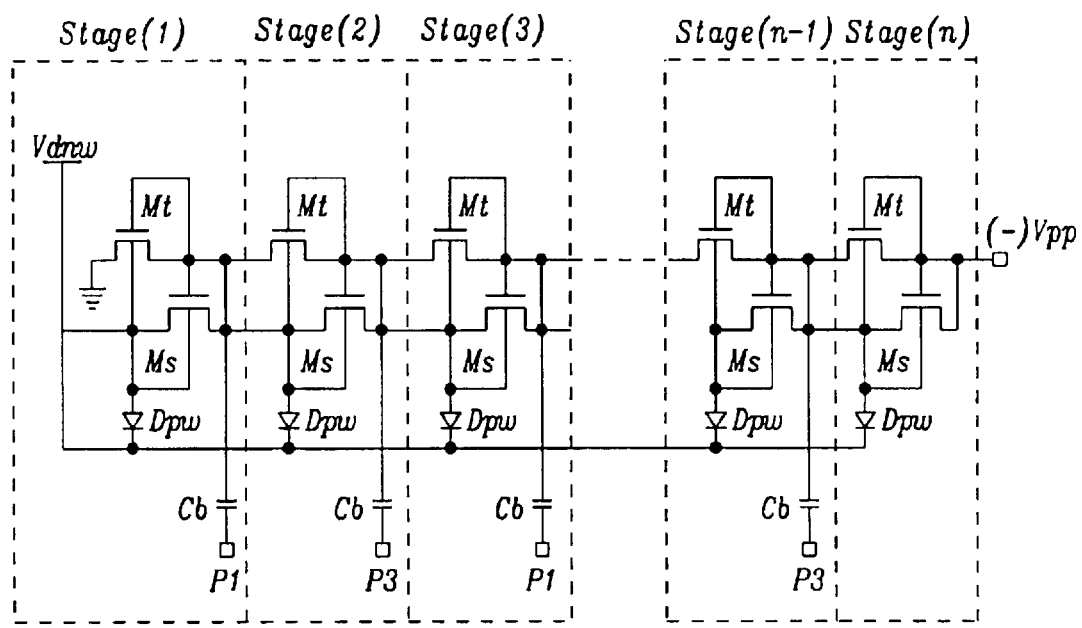
FIG. 13 is a circuit diagram of a negative voltage charge pump circuit of the present invention.

FIG. 13 is a circuit diagram of an embodiment of the present invention of a charge pump for generating a negative voltage output. The circuit uses an N-channel MOSFET as charge transfer device Mt and an auxiliary device Ms. The pumping stages are connected in series from ground to the negative output voltage (−)Vpp. Each pumping stage includes one charge transfer MOS device Mt, one auxiliary MOS device Ms and one coupling capacitor Cb. The P-well within each pump stage, Stage (1), Stage (2), Stage (3), Stage (n-1) and Stage (n), resides within a deep N-well and isolates the circuitry of each stage. The deep N-well can be common for each P-well or separate for each P-well. The auxiliary device Ms couples a boosted voltage to the P-well to reduce body effects on the pumped voltage within each stage. The diode Dpw represents the parasitic diode junction between the P-well and the deep N-well. A positive voltage Vdnw, which can be either VDD or ground, is applied to the deep N-well to insure that the diode Dpw remains back biased throughout the negative charge pump operations.

The circuit operation of the negative charge pump is carried out in the same manner as the positive charge pump circuit, except that the input of the charge pump circuit is coupled to the ground, instead of VDD. A two clock scheme using clocks P1 and P3, or P2 and P4, shown in FIG. 8 for the positive charge pump circuit can be used for the negative charge pump circuit. When the charge transfer MOS device Mt in a first pump stage is turned on by a clock signal, a boosted negative charge is created at the output of a first pump stage, which is coupled to the drain nodes of the charge transfer MOS device Mt and auxiliary MOS device Ms. The boosted negative charge is transferred to the input of a second pump stage connected to the output of the first pump stage. The boosted negative charge is coupled to a source of the charge transfer MOS device Mt in the second stage. At the same time, the auxiliary MOS device Ms of the first stage is also turned on so that the boosted negative charge of the output of the first pump stage is coupled to the P-well of the first pump stage. The coupling of the boosted negative charge to the P-well reduces the body effect on the charge transfer MOS device Mt, which results in an increased charge transfer efficiency.

While the invention has been particularly shown and described with reference to preferred embodiments thereof, it will be understood by those skilled in the art that various changes in form and details may be made without departing from the spirit and scope of the invention.

What is claimed is:

1. A charge pump circuit, comprising:
  a) a plurality of charge pump stages connected in series,
  b) each stage of said plurality of stages containing a first auxiliary device to precharge a voltage to a gate of a charge transfer device and a second auxiliary device to switch a substrate voltage of said charge transfer device,
  c) said each stage clocked by two clocks signals.

2. The circuit of claim 1, wherein said first and second auxiliary devices and said charge transfer devices are N-channel MOS devices contained within a P-well within a deep N-well on a P-substrate.

3. The circuit of claim 2, wherein said each stage further comprises a pull-down device to prevent a charge backflow between an output and an input of said each stage.

4. The circuit of claim 3, wherein said pull-down device is an N-channel MOSFET device that can reside either within said P-well within the deep N-well or on said P-substrate.

5. The circuit of claim 1, wherein each stage further comprises:
  a) a first capacitor connecting a first clock signal of said two clocks signals to a gate of said charge transfer device and a gate of said second auxiliary device, b) a second capacitor connecting a second clock signal of said two clocks signals to a gate of said first auxiliary device and an output of said charge transfer device.

6. The circuit of claim 1, wherein each stage that is adjacent to a first stage of said plurality of stages is clocked by said two clocks signals that are timed to be out of phase from the two clocks signals for the first stage.

7. The circuit of claim 1, wherein a first stage of said plurality of stages is clocked by said two clocks signals that are a first and second clock signal and stages adjacent to said first stage are clocked by the two clock signals that are a third and fourth clock signal.

8. The circuit of claim 1, wherein the first auxiliary device boosts an input voltage to said stage and couples the boosted voltage to a gate of the charge transfer device.

9. The circuit of claim 1, wherein the second auxiliary device buffers a drain of the charge transfer device from a P-well and a deep N-well of said triple well.

10. The circuit of claim 9, wherein said second auxiliary device reduces a body effect on said charge transfer device by transferring a boosted drain voltage of the charge transfer device to the P-well and the deep N-well.

11. The circuit of claim 10, wherein when said second auxiliary device is off, the P-well and the deep N-well are not coupled to any voltage source and float with a body voltage being kept in a reverse bias condition.

12. The circuit of claim 1, wherein said each stage is isolated by a separate and unique triple well.

13. The circuit of claim 1, wherein the charge transfer device and the first and second auxiliary devices are P-channel MOSFET devices residing in an N-well within a deep P-well on an N-substrate.

14. A circuit for pumping charge in a low voltage environment, comprising:
  a) a means for coupling a plurality of stages of charge pump circuits,
  b) a means for isolating devices between stages of said plurality of stages,
  c) a means for transferring a boosted charge from an input to an output of each stage of said plurality of stages,
  d) a means for precharging an input of a charge transferring device of said each stage,
  e) a means for switching a substrate voltage of said charge transferring device of said each stage.

15. The circuit of claim 14, wherein the means for coupling the plurality of stages of said charge pump circuits is by serially connecting an output of a charge transferring device in a first stage to a boosting device and to said charge transferring device of a second stage.

16. The circuit of claim 14, wherein the means for isolating devices between said plurality of stages is by enclosing said devices of each stage within a triple well unique to each stage.

17. The circuit of claim 14, wherein the means for transferring said boosted charge between the input and output of each stage further comprises;
  a) a first N-channel MOSFET device to produce said output,
  b) a second N-channel MOSFET device which boosts said input to a gate of said first N-channel device,
  c) a third N-channel MOSFET device for reducing a semiconductor body effect on said first N-channel MOSFET device.

18. The circuit of claim 17, further comprises a means for preventing backflow between the output and the input of said each stage of said plurality of stages.

19. The circuit of claim 17, wherein the second N-channel device boosts said input by coupling the input at a drain of said first N-channel device to a gate of the first N-channel device.

20. The circuit of claim 19, wherein the third N-channel device reduces a semiconductor body effect on said charge transferring device by coupling a boosted drain voltage of the charge transferring device to a triple well within which the charge transferring device resides.

21. The circuit of claim 17, wherein the first, second and third devices are P-channel MOSFET residing in an N-well within a deep P-well on, an N-substrate.

22. A method for creating a high voltage using a charge pump circuit, comprising:
  a) precharging a gate of a first charge transfer device in a first charge pump stage,
  b) switching a voltage of a substrate of said first charge transfer device in said first stage to reduce a body effect of said substrate of said charge transfer device of the first stage,
  c) clocking said first charge transfer device to store a boosted charge of an input of said first stage into a first capacitor to form an output of said first stage,
  d) coupling said output of said first stage to the input of a second stage,
  e) precharging a gate of a second charge transfer device in a second charge pump stage,
  f) switching the voltage of the substrate of said second charge transfer device in said second stage to reduce a body effect of said substrate of said charge transfer device of the second stage,
  g) clocking a second charge transfer device in said second stage to store said boosted charge of said input to said second stage into a second capacitor,
  h) coupling said output of said second stage to the input of a next stage.

23. The method of claim 22, wherein said second charge transfer device is clocked off when said first charge transfer device is clocked to store said boosted charge, and said first charge transfer device is clocked off when said second charge transfer device is clocked to store said boosted charge.

24. The method of claim 22, wherein said boosted charge is created at said output of said first and second stages with the assist of a precharge voltage applied to the charge transfer device and a switching of a voltage of the substrate of the charge transfer device to reduce a body effect of said substrate.

25. The method of claim 22 further comprising of an additional stage connected in series with the output of the second stage and performing in like manner to the first and second stages.

26. A negative high voltage charge pump circuit, comprising:
  a) a charge transfer MOS device and an auxiliary MOS device connected together in a P-well to form a negative high voltage charge pump circuit,
  b) said P-well residing in a deep N-well which is coupled to a positive voltage,
  c) said deep N-well residing on a P-substrate which is coupled to ground,
  d) a clock coupled to said charge transfer MOS device and to said auxiliary device through a coupling capacitor,
  e) an input of said negative high voltage charge pump circuit connected to a source of the charge transfer MOS device, f) an output of said negative high voltage charge pump circuit produced at a drain of the charge transfer MOS device.

27. The circuit of claim 26, wherein the charge transfer MOS device and the auxiliary MOS device are coupled together by connecting together the drains and gates of both the charge transfer device and the auxiliary device.

28. The circuit of claim 26, wherein the source of the auxiliary device is connected to the P-well and thereby reducing body effects by coupling a boosted output of charge transfer device to the P-well.

29. The circuit of claim 26, wherein said deep N-well contains additional negative high voltage charge pump circuits.

30. The circuit of claim 29, wherein said additional negative high voltage charge pump circuits are connected to said output in a serial fashion to create a negative high output voltage.

31. A circuit for pumping a negative high voltage, comprising:
 a) a means for clocking each stage of a plurality of stages of a negative charge pump circuit,
 b) a means for transferring a boosted negative charge from an input circuit to an output circuit of said plurality of stages,
 c) a means for coupling said boosted negative charge of each pump stage of said plurality of pump stages to a P-well associated with said each pump stage.

32. The circuit of claim 31, further comprising a means for containing said P-well of each stage within a common deep N-well, and wherein a positive voltage is coupled to said deep N-well.

33. The circuit of claim 31, wherein said means for transferring a boosted negative charge is controlled by clocking a first stage with a clock signal that is out of phase with said clock signal of a second stage that is connected to said first stage.

34. A method of creating a high voltage negative charge pump, comprising:
 a) coupling a plurality of negative charge pump stages together in a serial fashion,
 b) coupling an input of a first charge pump stage to a source of a charge transfer device,
 c) coupling a drain of the charge transfer device to an output of said first charge pump stage,
 d) coupling the output of the first charge pump stage to drain of an auxiliary device in said first charge pump stage and to said input of a second charge pump stage,
 e) coupling the source of said auxiliary device to a P-well containing said first charge pump stage,
 f) coupling a clock signal to a circuit node comprising a connection between gates and drains of the charge transfer device and the auxiliary device.

35. The method of claim 34, wherein coupling the source of the auxiliary device to the P-well couples a boosted charge to the P-well, thereby reducing body effects on the output of said charge pump stage contained within said P-well.

36. The method of claim 34, wherein coupling said clock signal connected to said circuit node in said first charge pump stage is out of phase with said clock signal connected to said circuit node in said second charge pump stage.

37. The method of claim 34, wherein the second charge pump stage is contained within a separate P-well from the P-well of the first charge pump stage.

38. The method of claim 34, wherein a plurality of said negative charge pump stages are contained within a plurality of P-wells which reside in a deep N-well on a P-substrate.

* * * * *